I. E. PALMER.
ANIMAL COVERING.
APPLICATION FILED MAR. 26, 1908.
965,834.
Patented July 26, 1910.
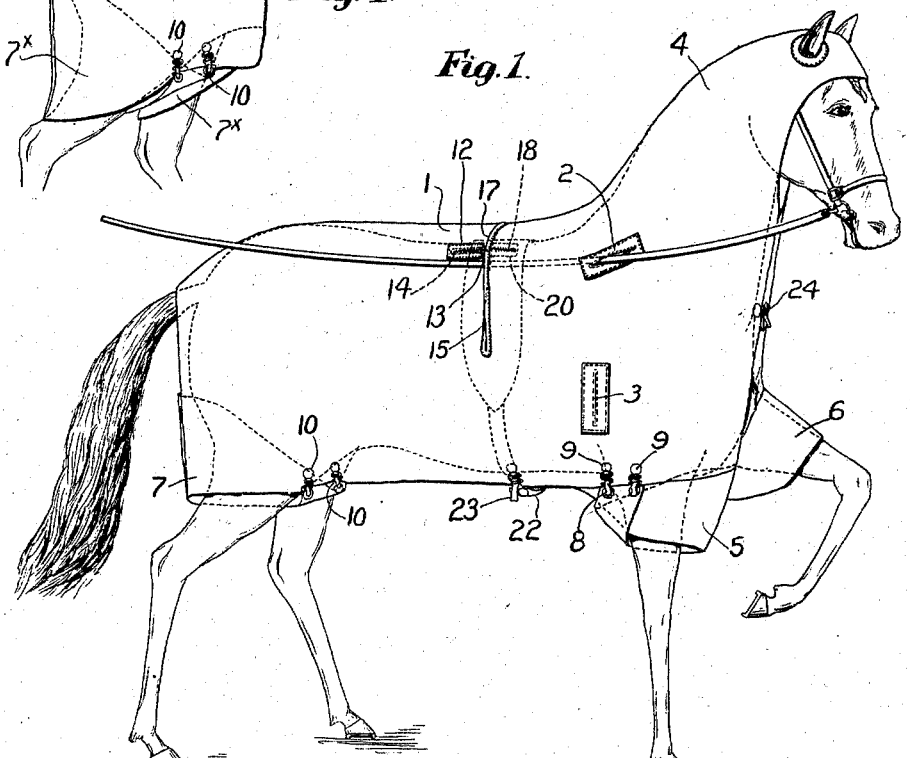
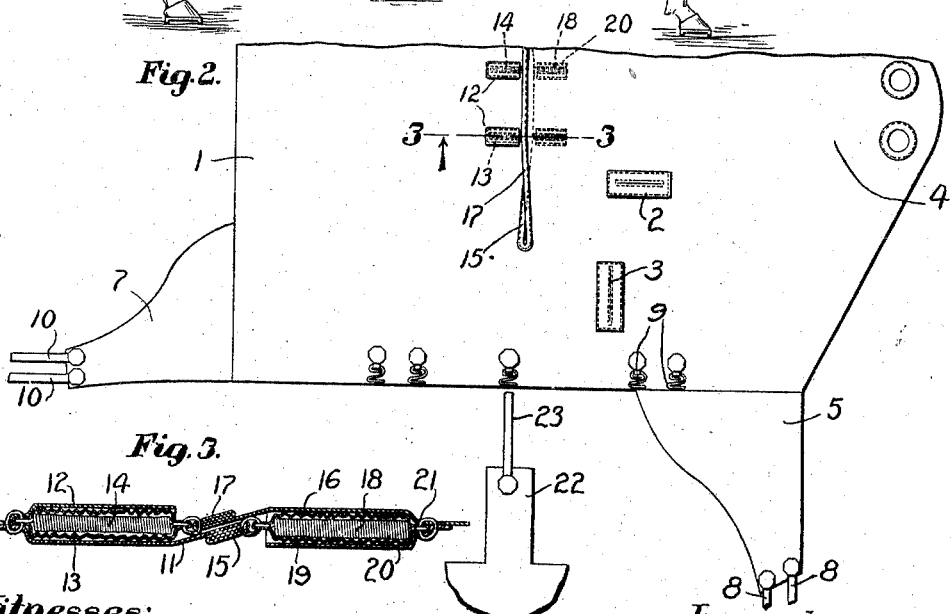
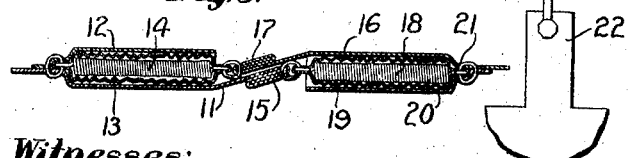
Witnesses:
Edwin P. Luce
Robert H. Kammler
Inventor:
Isaac E. Palmer;
by Emery and Booth
Att'ys.

UNITED STATES PATENT OFFICE.

ISAAC E. PALMER, OF MIDDLETOWN, CONNECTICUT, ASSIGNOR TO THE I. E. PALMER COMPANY, OF MIDDLETOWN, CONNECTICUT, A CORPORATION OF CONNECTICUT.

ANIMAL-COVERING.

965,834.  Specification of Letters Patent.  Patented July 26, 1910.

Application filed March 26, 1908. Serial No. 423,399.

*To all whom it may concern:*

Be it known that I, ISAAC E. PALMER, a citizen of the United States, residing at Middletown, in the county of Middlesex, State of Connecticut, have invented an Improvement in Animal-Coverings, of which the following description, in connection with the accompanying drawings, is a specification, like numerals on the drawings representing like parts.

This invention relates to animal covers, such as blankets, rubber covers for rainy weather, fly nets and the like.

In order that the principles of my invention may be clearly understood, I have in the accompanying drawings disclosed a single embodiment of my invention as a net or blanket adapted for use upon a horse.

In said drawings—Figure 1 is a side view of a horse provided with a blanket or net embodying my invention; Fig. 2 is a plan view of a portion of the net or blanket shown in Fig. 1 having the leg straps extended; Fig. 3 is a detail representing in longitudinal vertical section the preferred means for holding the edges of the slitted portion in the desired relation; and Fig. 4 is a detail of a slightly different form of leg extension or strip.

In my Patent No. 224,468, Feb. 10, 1880, I have disclosed a horse blanket and cover, which, while possessing many excellent characteristics, does not meet all the requirements of such an article. These requirements are fully met in the improved animal cover herein disclosed.

Referring more particularly to Figs. 1 and 2, the body member is indicated at 1, it being of any suitable material. If it be desired to employ the cover as a blanket, then it may be made of wool or of other suitable material and of proper thickness. If it be desired to use the same as a net, then preferably it is formed of open mesh material, the details of which it is not necessary herein to disclose. Within the scope of my invention, other materials may be used, as, for example, rubber or rubber cloth, such materials being particularly applicable for use in stormy weather. The blanket or net may, if intended for a horse, be used for either stable wear or upon the road, and hence may be provided with harness openings, as indicated at 2 in Figs. 1 and 2, and also thill openings, as indicated at 3.

It is apparent that the animal covering embodied in my invention may be employed in connection with animals other than horses, such as cows, dogs, etc.

In Fig. 1, I have represented the blanket as having a neck portion 4 extending up on the head of the animal and suitably secured thereto. If desired, however, such neck portion may be omitted.

In order more fully to protect the animal and also to aid in securing the cover in place, I provide the body member with preferably a plurality of extension members or strips. Herein, I have represented the body member as provided with front extensions 5 and 6 adapted to be wrapped about the front legs of the animals and with rear extensions or strips, one of which is indicated at 7. In view of the fact that the animal is more thoroughly protected by the leg extensions or strips, the cover as a whole and particularly if it be used as a blanket may be of lighter material and yet afford the same amount of protection, thus the blanket or cover need not be of increased weight, and yet it will afford increased protection over that illustrated in my former patent. It is apparent that the leg extensions or strips may be constructed in any suitable manner. Preferably, however, and as here shown, the front strips are secured to or extend from the forward portion of the lower side edges of the body member. The extensions or strips, whether at the front or rear, may be formed integral with the body member or suitably secured thereto. As represented in Fig. 1, in the present form of the invention, the front strips or extensions are adapted to be passed inwardly between the legs of the animal, and thence outwardly to be secured to the body member, for which purpose I have provided the strips with any suitable fastening means, such as bands 8 adapted to be secured to any suitable securing means, such as 9, upon the body member. While the rear extensions or strips, if employed, may be of any suitable construction, herein I have represented them as extending from or secured to the rear edge of the body member. In practice, they are passed inwardly between the legs of the animal, and thence outwardly, being secured to the body member in any suitable manner, as by the use of straps 10.

In my patent previously referred to, I have disclosed a blanket having a transverse opening, the edges of which are intended to be held in the desired relation to each other by means of elastic straps. Said straps, being formed of rubber, were not effective for the purpose intended, as the rubber soon deteriorated in use and permitted the edges of the opening to gap far apart. In order fully to meet all requirements and to overcome the objections to which I refer, I have employed metallic spring or springs and have placed them in suitable sheathings, which not only serve to protect the springs from rusting, but serve also to prevent expansion of the spring beyond the desired and predetermined maximum extent. Referring more particularly to Fig. 3, I have therein indicated the rear edge 11 of the slitted portion and which may be of any suitable extent as provided with a patch or cover 12, wherein and to which or to the body portion, but herein the former, I have secured one end of a sheathing 13 and also one end of a coiled spring 14, it being apparent that the coiled spring may be secured both to the body and pocket or merely to the sheathing. The said sheathing may be made of any suitable material. Preferably, however, it is made of some light flexible material, as, for example, cloth that may collapse or gather longitudinally when the spring is not subjected to tension. The edge portion 11 is provided preferably with a binding 15, and the forward edge portion 16 of the body member is preferably provided with a binding 17. To the binding 17 of the forward edge portion, the opposite ends of the sheathing 13 and coil spring 14 are connected. If desired, a spring 18 may be employed and positioned in a sheathing 19, the said sheathing and spring being herein represented as within a pocket 20 and connected at their forward ends to the body member, as indicated at 21 and at their rear ends to the binding 15 of the rear edge portion 11. It is apparent that any suitable number of springs may be employed. It will be apparent that when the sheathing is extended to its limit, it prevents the further and impairing expansion of the spring contained therein. By the means herein disclosed, I provide a cover or blanket permitting free movement of the animal tending to separate the edges of the slitted portion and yet insuring the restoration of said edges to their desired relation.

I do not in this application claim the edge holding means.

If desired, the cover may be provided with additional means for securing the edges. For example, in Figs. 1 and 2, I have represented a band 22 secured to one of the lower edges of the cover and having means as 23 for detachably securing the same to the opposite edge. If desired, means may be provided, as indicated at 24, for securing the front edges of the cover.

It will, of course, be apparent that the width or extent of each leg covering may be such as is desired or found necessary. For example, and as shown in Fig. 4, the rear extensions may be made of increased width, as represented at $7^x$, so as to cover a greater portion of the legs of the animal.

It will be apparent that an animal blanket provided with leg extensions may be maintained in position upon the animal without the employment of a girth or other means secured directly to the body of the animal.

Having thus described one type or embodiment of my invention, I desire it to be understood that although specific terms are employed, they are used in a generic and descriptive sense and not for purposes of limitation, the scope of the invention being set forth in the following claims.

Claims:

1. An animal covering composed of a body member to be received upon the body of the animal, and provided with one or more strips extending therefrom and adapted to be wrapped about a leg or legs of the animal, the said strip or strips having means for securing the end or ends thereof directly to the body member.

2. An animal covering composed of a body member to be received upon the body of the animal and provided with one or more strips extending from an edge thereof and adapted to be passed inwardly between the animal's legs and thence outwardly, and having means whereby the end or ends thereof may be secured directly to the edge portion or portions of the said body member.

3. An animal covering composed of a body member adapted to be received upon the body of the animal and provided with front and rear strips, the front strips extending from the forward portion of the lower edges and adapted to be passed inwardly between the animal's front legs and thence outwardly and having means whereby they may be secured directly to the edge portions of the body member, the rear strips extending from the rear edges of the body member and adapted to be passed inwardly between the animal's legs, and thence outwardly and having means whereby they may be secured directly to the edge portions of the body member.

In testimony whereof, I have signed my name to this specification, in the presence of two subscribing witnesses.

ISAAC E. PALMER.

Witnesses:
 TOWNSEND PALMER,
 IRVING U. TOWNSEND.